US005497926A

United States Patent [19]

Rittenhouse

[11] Patent Number: 5,497,926

[45] Date of Patent: Mar. 12, 1996

[54] WHEELCHAIR-ACCESSORY SUPPORT-FRAME

[76] Inventor: Donald K. Rittenhouse, 241 Prairie View, Oregon, Wis. 53575-1416

[21] Appl. No.: 247,768

[22] Filed: May 23, 1994

[51] Int. Cl.$^{6}$ ...................... B60R 11/00

[52] U.S. Cl. ...................... 224/407; 224/538; 224/551; 280/304.1

[58] Field of Search ...................... 224/42.45 R, 42.41, 224/0.5, 273, 407, 538, 547, 551, 558; 280/304.1

[56] References Cited

U.S. PATENT DOCUMENTS

| | | | |
|---|---|---|---|
| 4,555,124 | 11/1985 | Millington | 280/304.1 |
| 4,720,117 | 1/1988 | Hay | 280/304.1 X |
| 4,888,005 | 12/1989 | Dingeman et al. | 280/304.1 X |
| 5,241,876 | 9/1993 | Mathis | 280/304.1 X |
| 5,374,074 | 12/1994 | Smith | 280/304.1 |

*Primary Examiner*—Renee S. Luebke
*Attorney, Agent, or Firm*—Antonio R. Durando

[57] ABSTRACT

A telescopically-expandable horizontal brace that has two ends adapted for secure coupling to the hanger brackets of a conventional wheelchair. Because of its telescopic construction, the brace collapses when the wheelchair is folded shut, thus permitting its normal utilization and storage without removal of the brace. Utility openings and hooks are provided along the length of the brace for attaching bodily-fluid discharge containers and other utility items thereto.

16 Claims, 3 Drawing Sheets

WHEELCHAIR-ACCESSORY SUPPORT-FRAME

BACKGROUND OF THE INVENTION

1. Field of the Invention

This invention pertains to the general field of wheelchair accessories and, in particular, to a support frame adapted for mounting on the hanger brackets of a wheelchair for holding utility items of interest to a user.

2. Description of the Prior Art

Wheelchair users are often seriously disabled or ill and in need of continuous intravenous administration of medication or nourishment. Typically, these are dispensed by gravity from containers that are fastened to vertical support arms projecting upward from the back of the wheelchair, so as to enable dispensation while the wheelchair is in use. Similarly, patients who suffer from incontinence as a result of paralysis, illness or surgery, such as when a drainage tube is inserted into the bladder, require the continuous use of a urine reservoir, normally referred to as a Foley or catheter bag, adapted to receive fluid bodily discharges while the patient is using the wheelchair. Unfortunately, no provision is made in the design and construction of standard wheelchairs for holding such containers in a suitable position for the continued efficient operation of the wheelchair. Therefore, people confined to a wheelchair and in need of such a utility container usually adopt make-shift solutions that involve rigging up the container under the seat and between the wheels of the chair. This solution is cumbersome, inefficient, and potentially dangerous because of the obstruction created by the container while trying to operate the wheelchair in a normal manner.

Thus, there exists a need for a simple, economical, and more practical device for mounting a fluid discharge container on the frame of a wheelchair. This invention is directed at providing a solution to these problems.

BRIEF SUMMARY OF THE INVENTION

One objective of this invention is an accessory support-frame adapted for mounting on the hanger brackets of a standard wheelchair for carrying a catheter bag while the chair is being used under normal operation.

Another goal is the development of an apparatus that is simple in construction and suitable for efficient installation between the left and right hanger brackets in front of the seat of the wheelchair.

Yet another goal is a device that permits the normal folding of the wheelchair without requiring disassembly of the support bracket of the invention.

Another objective of the invention is that it be sufficiently compact so as not to interfere with the normal use of the wheelchair.

A further objective is a device that permits the easy placement and removal of a Foley bag or similar utility container by a user while in a sitting position in the wheelchair.

Yet another goal of the invention is its easy installation and removal, so that it can be promptly transferred between wheelchairs.

Finally, an objective of this invention is the realization of the above mentioned goals in an economical and commercially viable manner. This is done by utilizing simple components that are either already available in the open market or that can be produced at competitive prices.

In accordance with these and other objectives, the device of this invention consists of a telescopically-expandable horizontal brace having two ends adapted for secure coupling to the hanger brackets of a conventional wheelchair. Because of its telescopic construction, the brace collapses when the wheelchair is folded shut, thus permitting its normal utilization and storage without removal of the brace. Utility openings and hooks are provided along the length of the brace for attaching bodily-fluid discharge containers and other utility items thereto.

Various other purposes and advantages of this invention will become clear from its description in the specifications that follow and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

DETAILED DESCRIPTION OF THE INVENTION

This invention arises from a need that sophisticated wheelchair designs and methods of construction have yet left unsatisfied. In spite of all the accessories and utility devices available for use with conventional wheelchairs, no apparatus has been devised for facilitating the simple task of carrying a bodily-fluid discharge container below the seat of the chair. All components of this invention are chosen with a view to minimizing the space occupied by the apparatus while maintaining its effectiveness in a moving wheelchair.

Figure 1:
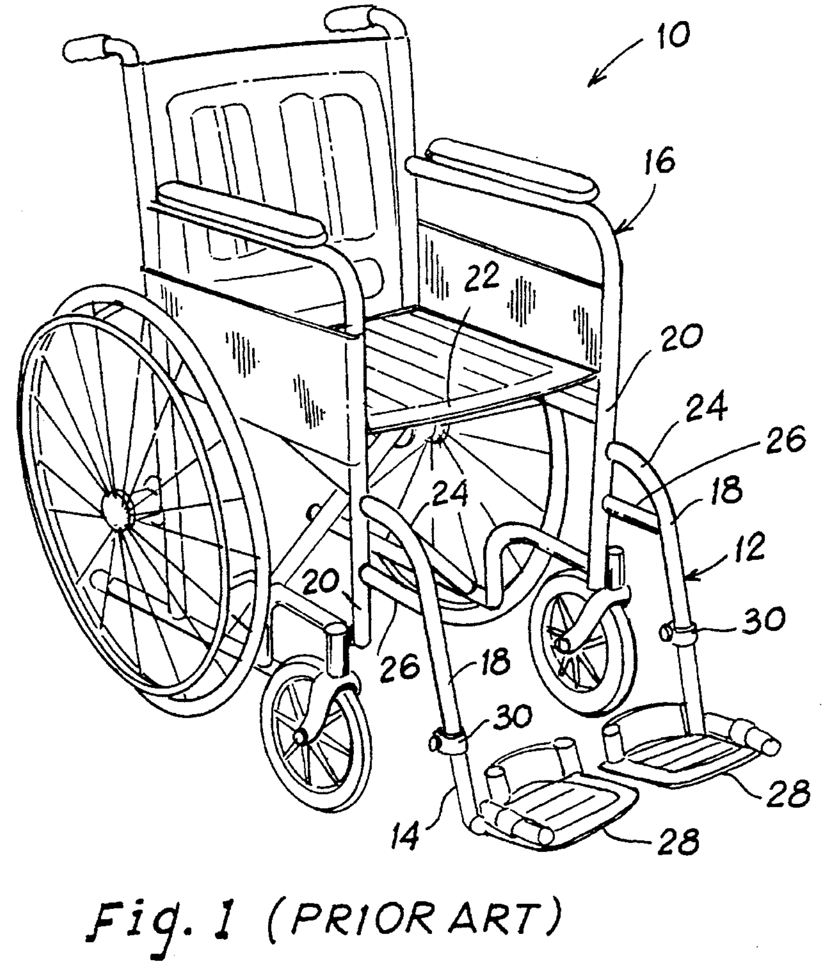
Fig. 1 (PRIOR ART)
FIG. 1 is a free-standing perspective view of a conventional wheelchair to which the device of the present invention is directed.

Referring to FIG. 1, a perspective view of a conventional wheelchair 10 is shown to illustrate the placement and functioning of the present invention as an accessory thereto. The wheelchair 10 comprises a left hanger bracket 12 and a right hanger bracket 14 connected to the main frame 16 of the chair. Each hanger bracket consists of a tubular structure 18 attached to the front supporting post 20 on each side of the seat 22. The tubular structure 18 comprises a bifurcated upper end with upper and lower substantially-parallel horizontal members 24 and 26, respectively, hingedly attached to the posts 20 so as to enable the outward swiveling of the hanger brackets to clear access to the seat 22 of the wheelchair. A substantially horizontal footplate 28 is mounted on the tubular structure 18 on each side for supporting the feet of a person sitting in the wheelchair, such that it can be moved without affecting the position of the person's legs and feet. A telescopic connection 30 permits adjustment of the elevation of each footplate to improve comfort and further ensure safe use of the chair.

Figure 2:
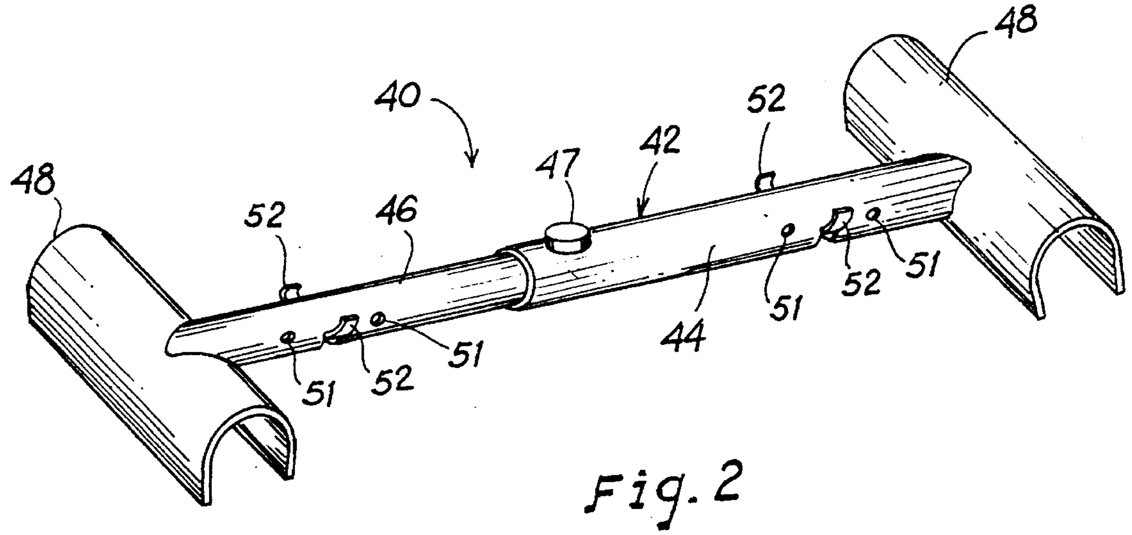
FIG. 2 is a perspective view of the preferred embodiment of the brace of the invention.

The preferred embodiment of the brace 40 of the present invention is illustrated in perspective view in FIG. 2. It consists of a horizontal truss 42 comprising an outer tubular member 44 and a confirming inner tubular member 46 telescopically connected to provide a variable-length brace. The cross-section of member 44 and 46 is preferably circular for ease of construction, but any shape that affords slidable engagment of the two for telescopic connection is acceptable to practice the invention. A screwably-mounted locking bolt 47 on the outer member 44 adapted for exerting retaining pressure on the inner member 46 (or other equivalent locking mechanism) may be provided to prevent the contraction or expansion of the truss 42 after adjustment to the desired length.

Figure 3:
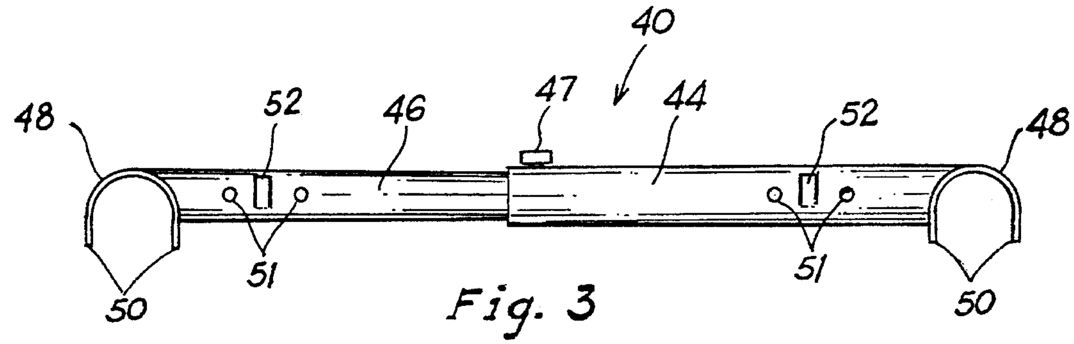
FIG. 3 is an elevational front view of the brace shown in FIG. 2 illustrating transverse end channels for mounting the brace on the hanger brackets of a wheelchair.
Figure 4:
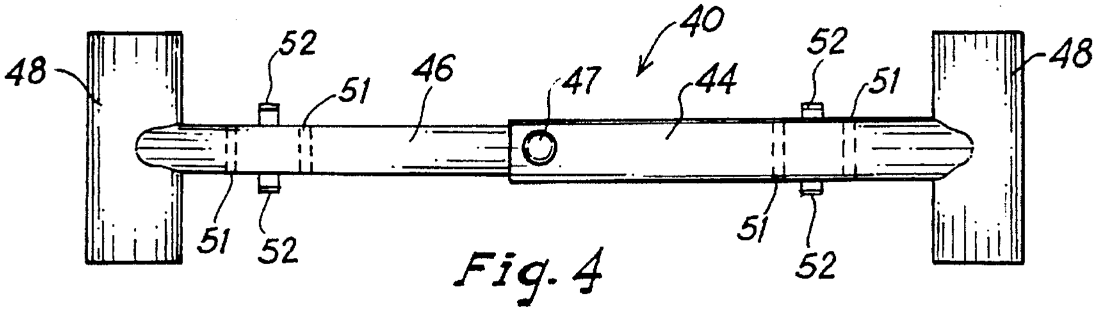
FIG. 4 is a top plan view of the brace of FIG. 2 illustrating utility hooks disposed along the length of the brace.

The outer end of each tubular member 44 and 46 contains means for rigidly coupling it to the hanger brackets on each side of a wheelchair, such as a transversely-disposed member 48 adapted to fit over one of the lower horizontal members 26 of the chair's hanger brackets. As seen in the front elevational view of FIG. 3, the preferred configuration of the transverse member 48 is a semi-circular channel-like segment of open pipe having an inner diameter approximately equal to the outer diameter of the member 26 (which is circular in standard wheelchairs) and having elongated side walls 50 for securely engaging and retaining the member 26 therebetween. Preferably, the transverse members 48 are made of resilient material, such as metal or plastic, and sized to provide a snap-on connection with the horizontal members 26 of the wheelchair's hanger brackets. Also, as illustrated in the plan top view of FIG. 4, at least one transverse member 48 should be sufficiently long to provide lateral support to prevent rotation of the brace 40, which would create instability in the connection between the brace and the hanger brackets. Obviously, the transverse members 48 cannot be longer than the horizontal members 26 over which they are intended to fit.

Because of the telescopic construction of the truss 42, the length of the brace 40 may be adjusted to conform to the distance between the right and left hanger brackets of different wheelchairs, as needed to make the brace fit. In addition, the truss 42 is able to contract while a wheelchair is being folded shut, so that it does not require removal prior to stowing of the chair. Obviously, if a locking bolt 47 is provided, it must be released prior to folding of the wheelchair to permit the telescopic contraction of the truss 42. While the telescopic feature is not essential to the invention, it provides a convenient advantage over a device of single-piece construction, which would require removal prior to folding the wheelchair for storage or transportation.

Figure 5:
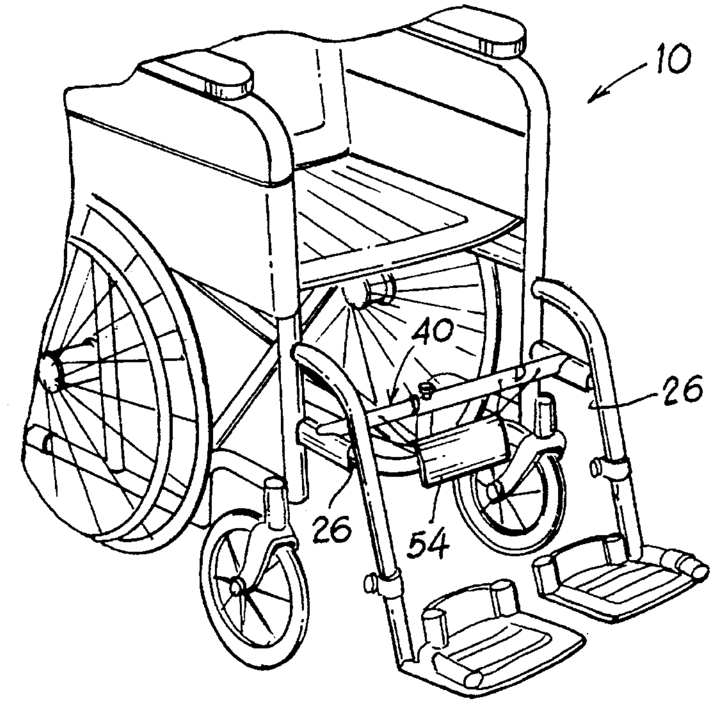
FIG. 5 is a partial perspective view of the invention in use illustrating a wheelchair having the brace installed between the hanger brackets and a fluid container attached thereto.

Conventional Foley bags are equipped with straps or strings for attachment to appropriate support structures. Accordingly, the brace 40 of the invention is equipped with a plurality of perforations 51 and/or hooks 52, or both, for securing the straps or strings of the bag to the horizontal truss 42 of the brace. Once so fastened, the bag is thus positioned below the seat and behind the legs of a person occupying the wheelchair, away from any interference with the normal use of the chair. FIG. 5 is an illustration of a chair 10 after installation of the brace 40 of the invention over the hanger brackets of the chair and after attachment of a typical catheter bag 54 thereto.

Figure 6:
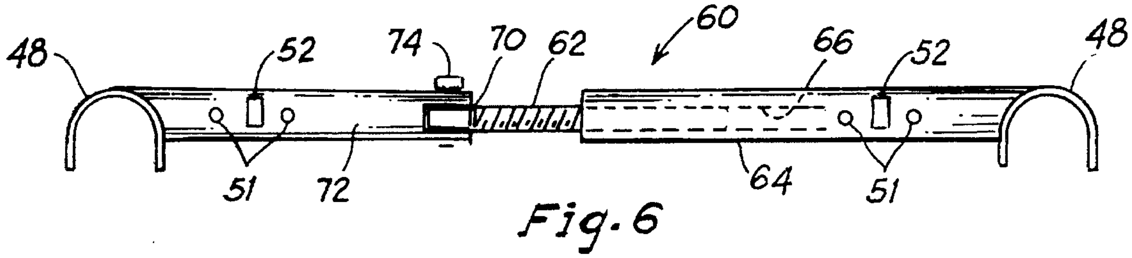
FIG. 6 is another embodiment of the brace of the invention illustrating a turn-bolt means for adjusting the length of the brace.
Figure 7:
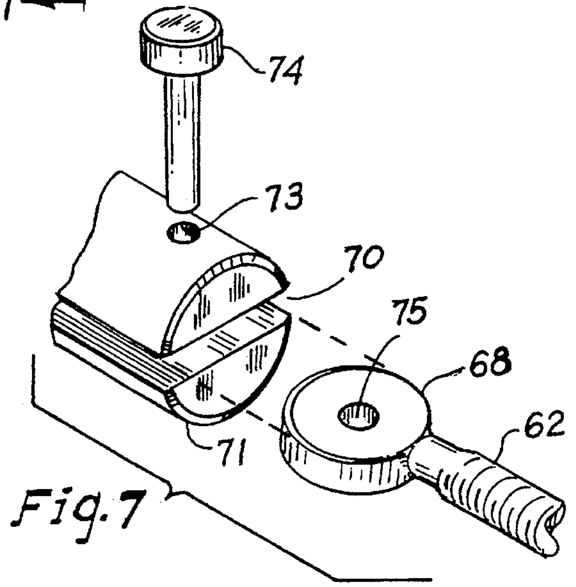
FIG. 7 is an enlarged partial view of the coupling mechanism between the two truss members of the brace shown in FIG. 6.

In another embodiment 60 of the invention illustrated in FIG. 6, a different method of providing adjustability to the length of the brace is shown. A turn-bolt 62 is screwably mounted on one of the truss members 64, preferably by means of a threaded longitudinal opening 66 in a solid-core portion of the member, so that the turn-bolt is firmly attached to the member and may be inserted into or extracted from it simply by its screwable rotation. As illustrated in the enlarged partial view of FIG. 7, the head 68 of the turn-bolt is adapted for fitting into a receiving slot 70 in the inside end 71 of the other truss member 72 constituting the brace 60 and a lock pin 74 is provided to firmly retain the lock-bolt within the slot through apposite through-holes 73 and 75. Preferably, both the head 68 and the slot 70 have conforming horizontal flat surfaces that provide stability to the coupling between the two. Thus, the two truss members 64 and 72 may be disconnected to permit folding of the wheelchair without prior removal of the brace.

Figure 8:
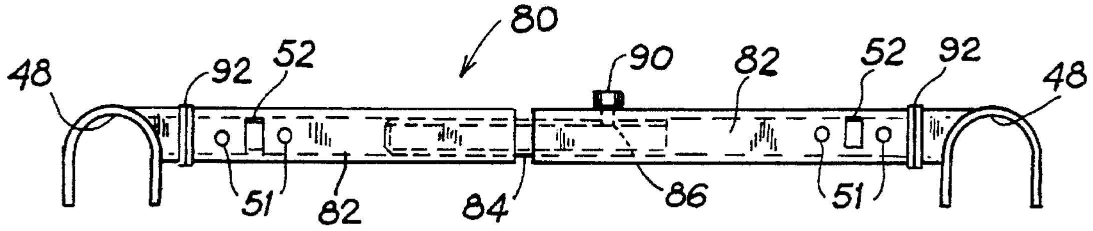
FIG. 8 is an elevational view of another embodiment of the brace of the invention illustrating a sliding-bolt coupling mechanism.
Figure 9:
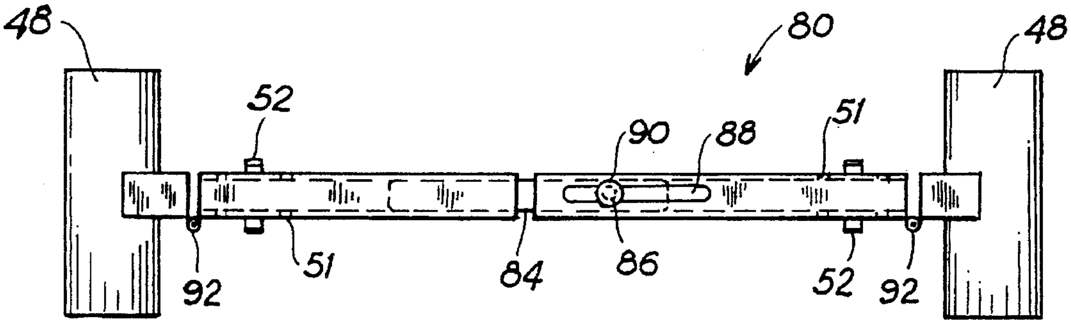
FIG. 9 is a top view of the embodiment of FIG. 8.

In yet another embodiment 80 of the invention, seen in FIGS. 8 and 9, two tubular truss members 82 are rigidly coupled by a sliding bolt 84 mounted in one of the members and adapted for slidably engaging the other, so as to provide a releasable rigid connection between the two. A sliding lever 86 protruding through a slot 88 in the truss member housing the bolt 84 is provided for manually sliding the bolt in and out of the other truss member. The bolt is then locked in place by retaining means, such as a knob 90 screwably mounted on the lever 86, so that the the two truss members may safely be coupled to form a single horizontal support structure. Each truss member 82 is connected to a transverse member 48 by means of a vertical hinge 92 in the front side of the support frame, such that the truss members may swing forward when the bolt 84 is unlatched, thus permitting the unencumbered folding of a wheelchair.

Figure 10:
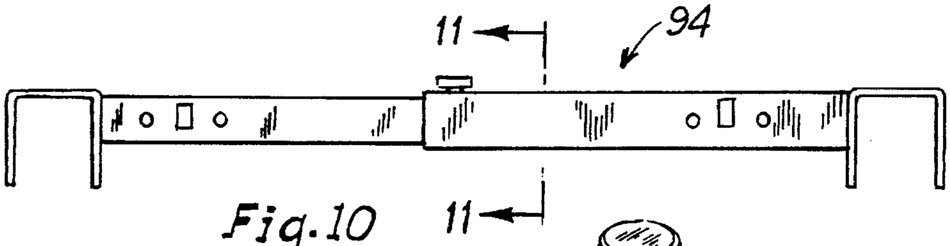
FIG. 10 is yet another embodiment of the brace of the invention illustrating a method of construction with square tubing.
Figure 11:
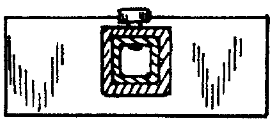
FIG. 11 is a cross-sectional view of the brace of FIG. 10 taken from line 11—11 in that figure.

Various changes in the details, steps and materials that have been described may be made by those skilled in the art within the principles and scope of the invention herein illustrated and defined in the appended claims. For example, square or rectangular tubing may be used in the construction of the truss members or the transverse members of the brace (or both), as shown in the embodiment 94 of the invention illustrated in FIGS. 10 and 11. In the telescopic configuration of the truss members, each component could be manufactured or coated with anti-friction material to facilitate their sliding during extension and contraction. The invention is described as an accessory for a conventional wheelchair constructed with circular tubing material, but the same functional principles can be applied to any other form of construction, so long as the brace is firmly anchored to the hanger-bracket components of the chair.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

What I claim is:

1. A brace for carrying a utility item below a seat of a wheelchair without interference with normal operation of the wheelchair by a user, said wheelchair being equipped with two hanger brackets that include horizontal members attached to a frame of the wheelchair and disposed at a predetermined distance on the right and left side of the seat, said brace comprising:

(a) a horizontal truss of a length sufficient to span the predetermined distance between said two horizontal members of the hanger brackets; and (b) means for securely anchoring said horizontal truss to the horizontal members in said hanger brackets;

wherein said means for securely anchoring said horizontal truss to the horizontal members in said hanger brackets consists of a transverse segment of downward-facing semi-circular channel attached to each end of the horizontal truss, said semi-circular channel being made of resilient material and sized to provide a snap-on connection with the horizontal members of the wheelchair's hanger brackets;

thereby enabling said user to hang and carry the utility item below the seat during normal operation of the wheelchair.

2. The brace defined in claim 1, wherein said horizontal truss consists of two telescopically-connected tubular members, whereby the length of the truss may be adjusted to conform to different-size wheelchairs and to retract when a wheelchair is folded shut while the brace is mounted thereon.

3. The brace defined in claim 2, wherein said tubular members have a circular cross-section.

4. The brace defined in claim 2, wherein said tubular members have a square cross-section.

5. The brace defined in claim 2, wherein said tubular members have a rectangular cross-section.

6. The brace defined in claim 2, further comprising a locking mechanism on said telescopically-connected tubular members to prevent sliding therebetween after adjustment to a desired length.

7. The brace defined in claim 6, wherein said locking mechanism consists of a bolt screwably mounted on one of the tubular members and adapted for exerting retaining pressure on the other tubular member.

8. A brace for carrying a utility item below a seat of a wheelchair without interference with normal operation of the wheelchair by a user, said wheelchair being equipped with two hanger brackets that include horizontal members attached to a frame of the wheelchair and disposed at a predetermined distance on the right and left side of the seat, said brace comprising:

(a) a horizontal truss of a length sufficient to span the predetermined distance between said two horizontal members of the hanger brackets;

(b) means for securely, anchoring said horizontal truss to the horizontal members in said hanger brackets; and (c) means for attaching said utility item to the horizontal truss;

wherein said means for attaching said utility item to the horizontal truss consists of at least one perforation in said horizontal truss;

thereby enabling said user to hang and carry the utility item below the seat during normal operation of the wheelchair.

9. The brace defined in claim 8, wherein said means for securely anchoring said horizontal truss to the horizontal members in said hanger brackets consists of a transverse segment of downward-facing semi-circular channel attached to each end of the horizontal truss, and said semi-circular channel includes elongated side walls for securely engaging and retaining the horizontal member in said hanger brackets of the wheelchair.

10. The brace defined in claim 8, wherein said horizontal truss consists of two members rigidly connected by a turn-bolt that is screwably mounted on one member and releasably coupled to the other member, whereby the length of the truss may be adjusted to conform to different-size wheelchairs and the two members may be decoupled when a wheelchair is folded shut while the brace is mounted thereon; and wherein said means for securely anchoring said horizontal truss to the horizontal members in said hanger brackets consists of a transverse segment of downward-facing semi-circular channel attached to each end of the horizontal truss, said channel having an inner diameter approximately equal to the outer diameter of said horizontal members in the hanger brackets of the wheelchair for engagement therewith.

11. A brace for carrying a utility item below a seat of a wheelchair without interference with normal operation of the wheelchair by a user, said wheelchair being equipped with two hanger brackets that include horizontal, members attached to a frame of the wheelchair and disposed at a predetermined distance on the right and left side of the seat, said brace comprising:

(a) a horizontal truss of a length sufficient to span the predetermined distance between said two horizontal members of the hanger brackets;

(b) means for securely anchoring said horizontal truss to the horizontal members in said hanger brackets; and (c) means for attaching said utility item to the horizontal truss;

wherein said means for attaching said utility item to the horizontal truss consists of at least one hook in said horizontal truss;

thereby enabling said user to hang and carry the utility item below the seat during normal operation of the wheelchair.

12. The brace defined in claim 11, wherein said means for securely anchoring said horizontal truss to the horizontal members in said hanger brackets consists of a transverse segment of downward-facing semi-circular channel attached to each end of the horizontal truss, said channel having an inner diameter approximately equal to the outer diameter of said horizontal members in the hanger brackets of the wheelchair for engagement therewith.

13. A brace for carrying a utility item below a seat of a wheelchair without interference with normal operation of the wheelchair by a user, said wheelchair being equipped with two hanger brackets that include horizontal members attached to a frame of the wheelchair and disposed at a predetermined distance on the right and left side of the seat, said brace comprising:

(a) a horizontal truss of a length sufficient to span the predetermined distance between said two horizontal members of the hanger brackets; and (b) means for securely anchoring said horizontal truss to the horizontal members in said hanger brackets;

wherein said horizontal truss consists of two members hingedly connected to said means for securely anchoring said horizontal truss to the horizontal members in the hanger brackets, wherein said members are rigidly connected by a sliding bolt that is slidably mounted on one member and adapted to releasably engage the other member, whereby each member may be disconnected and swung forward when a wheelchair is folded shut while the brace is mounted thereon.

14. The brace defined in claim 13, wherein said means for securely anchoring said horizontal truss to the horizontal members in said hanger brackets consists of a transverse segment of downward-facing semi-circular channel attached to each end of the horizontal truss, said channel having an inner diameter approximately equal to the outer diameter of said horizontal members in the hanger brackets of the wheelchair for engagement therewith.

15. The brace defined in claim 14, further comprising means for attaching said utility item to the horizontal truss.

16. The brace defined in claim 15, wherein said means for attaching said utility item to the horizontal truss consists of at least one perforation in said horizontal truss.

* * * * *